United States Patent [19]

Prager

[11] Patent Number: 5,255,386
[45] Date of Patent: Oct. 19, 1993

[54] METHOD AND APPARATUS FOR INTELLIGENT HELP THAT MATCHES THE SEMANTIC SIMILARITY OF THE INFERRED INTENT OF QUERY OR COMMAND TO A BEST-FIT PREDEFINED COMMAND INTENT

[75] Inventor: John M. Prager, Ashland, Mass.

[73] Assignee: International Business Machines Corporation, Armonk, N.Y.

[21] Appl. No.: 476,845

[22] Filed: Feb. 8, 1990

[51] Int. Cl.⁵ .................. G06F 15/40; G06F 15/403; G06F 7/20
[52] U.S. Cl. .................. 395/600; 364/DIG. 1; 364/226.4; 364/274.8; 364/274; 364/419.08; 364/274.2; 364/274.4; 364/274.5; 364/282.1; 364/283.3
[58] Field of Search .................. 395/12, 600, 76; 364/513, 300, 900, 419

[56] References Cited

U.S. PATENT DOCUMENTS

| | | | |
|---|---|---|---|
| 4,044,475 | 8/1977 | Fujisawa et al. | 35/6 |
| 4,270,182 | 5/1981 | Asija | 364/900 |
| 4,384,329 | 5/1983 | Rosenbaum et al. | 364/419 |
| 4,500,964 | 2/1985 | Nickle | 364/300 |
| 4,587,520 | 5/1986 | Astle | 340/712 |
| 4,648,062 | 3/1987 | Johnson et al. | 364/900 |
| 4,670,848 | 6/1987 | Schramm | 364/513 |
| 4,680,729 | 7/1987 | Steinhart | 364/900 |
| 4,701,130 | 10/1987 | Whitney et al. | 434/118 |
| 4,736,296 | 4/1988 | Katayama et al. | 364/419 |
| 4,783,758 | 11/1988 | Kucera | 364/419 |
| 4,787,035 | 11/1988 | Bourne | 364/300 |
| 4,803,642 | 2/1988 | Muranaga | 395/62 |
| 4,887,212 | 12/1989 | Zamora et al. | 364/419 |
| 4,916,614 | 4/1990 | Kaji et al. | 364/419 |
| 4,931,935 | 6/1990 | Ohira et al. | 364/419 |
| 4,943,932 | 7/1990 | Lark et al. | 395/76 |
| 4,972,349 | 11/1990 | Kleinbeger et al. | 364/900 |
| 5,099,425 | 3/1992 | Kanno et al. | 364/419 |
| 5,109,509 | 4/1992 | Katayama et al. | 395/600 |
| 5,122,951 | 6/1992 | Kamiya | 364/419 |
| 5,123,103 | 6/1992 | Ohtaki et al. | 395/600 |
| 5,146,406 | 9/1992 | Jensen | 364/419 |
| 5,197,005 | 3/1993 | Shwartz et al. | 364/419 |

OTHER PUBLICATIONS

Proceedings–The Fourth Conference on Artificial Intelligence Applications, 14–18 Mar. 1988, S. Diego, Calif., pp. 28–33; Ursula Wolz, Gail E. Kaiser: "A Discourse-Based Consultant for Interactive Environments".

M. J. Darnell, "Learning Idiomatic Versus Compound Generic Command Names", Jan. 1986, IBM, HFC54.

R. E. Kimbrell, "Fuzzy", Jul. 1988, AI Expert, pp. 56–63.

Marshall et al., "The Intelligent Help System: Linking a User to System Knowledge", Feb. 1986, pp. 81–86, IEEE.

*Primary Examiner*—Thomas C. Lee
*Assistant Examiner*—Wayne Armsbury
*Attorney, Agent, or Firm*—Marc A. Block; Philip R. Wadsworth; Douglas R. McKechnie

[57] ABSTRACT

A data processing system which suggests a valid command to a user when the user enters a question or an erroneous command. The purposes of the various commands executable by the system are stored as a plurality of intents. When the user enters a question or an erroneous command, the system looks up the intent corresponding to it and semantically compares such an intent with other intents. When another intent is found, based on the comparison, to be within a predetermined degree of similarity, the command defined by such other intent is offered as a suggestion to the user.

9 Claims, 4 Drawing Sheets

METHOD AND APPARATUS FOR INTELLIGENT HELP THAT MATCHES THE SEMANTIC SIMILARITY OF THE INFERRED INTENT OF QUERY OR COMMAND TO A BEST-FIT PREDEFINED COMMAND INTENT

This invention relates to a data processing system having an intelligent help system, and, more particularly, to improvements in intelligent help systems whereby such systems, in response to the user entering a command which is invalid, will suggest to the user another command that lies within a predetermined degree of semantic similarity to the invalid command.

RELATED APPLICATION

U.S. patent application Ser. No. 07/461,513, filed Jan. 5, 1990, entitled "METHOD AND APPARATUS PROVIDING AN INTELLIGENT HELP EXPLANATION PARADIGM PARALLELING COMPUTER USER ACTIVITY", by D. L. Gardner, D. M. Lamberti, and J. M. Prager, now pending, and assigned to the assignee of this application, describes an intelligent help system in which the present invention can be used. Such application is hereby incorporated herein by reference.

BACKGROUND OF THE INVENTION

During the course of using a computer, a user may make mistakes in entering commands or have questions about how to accomplish a particular function or goal. Various levels of on-line help systems have been provided to assist users. A very simple level is one in which the system, in response to the entry of an erroneous command, outputs an error code or a short message. The user's response depends upon the user's knowledge which varies greatly dependent upon the user's training and experience with using computers. An experienced person usually would know the proper response, upon receiving an error message, but even experts often need help. A less experienced person would have to look up the answer in a manual or ask a more knowledgeable person what to do. Some computers are provided with on-line help systems in which full text or shortened descriptions of system commands can be accessed by a user pressing a help key. Such descriptions may or may not be helpful dependent upon the user's expertise and ability through trial-and-error methods to choose the right option. Such descriptions are general in nature and are not tailored to the specifics of the user's activity.

The above identified related application describes an intelligent help system which uses principles of artificial intelligence to suggest to the user, in response to the entry of a question or an erroneous command, one or more suggestions containing commands and actions the user might make, along with an explanation paradigm explaining why such suggestions were made and how they work. The system includes a rules base containing various generic rules to be applied in creating the suggestions and explanations. Such generic rules do the following: correct the spelling of a command, correct the spelling of arguments, correct the path, complete a command, change a command to one with similar meaning, select a command to satisfy the given command's preconditions, select a command whose intent matches the given goal, transform the given goal into a more general one, and break the goal into subgoals. The present invention resides in the manner of applying the above rule of changing a command to one with similar meaning.

Within prior art help systems, the closest prior art of which I am aware, is the common practice of providing precanned text that refers a user to some other area or place for an explanation of something that might be related or similar, e.g., "See command 'xxx' in reference manual". Such referral is in the nature of a cross reference and does not provide the user with any suggestion of commands or actions to be taken by the user. Such referral leaves it up to the user to determine the degree of closeness or similarity to the user's goals.

The problem of using data processing techniques to determine closeness has been recognized in areas other than help systems. M. J. Darnell, "Learning Idiomatic Versus Compound Generic Command Names", report number HFC 54, January 1986, IBM Corporation, Human Factors Center, San Jose, Calif., investigated the ease of learning to use idiomatic commands in a computer system. Idiomatic commands use verbs with similar meanings for different operations, each different command being mapped to a different operation. No use is made in an intelligent help system and no discussion is made on determining any degree of closeness. R. E. Kimbrell, "Fuzzy", AI EXPERT (July 1988), 56–63, describes a method for determining, in response to a user's query into a data base management system, what records are "close" as opposed to an "exact" fit. The method involves continuous Boolean functions and counting the number of words, characters or two character snippets of text occurring in a record word or string compared against the query. No discussion is presented on using such a technique in an intelligent help system, nor of determining the degree of semantic closeness as is done in the present invention.

It is also to be noted that there are commercially available spell checking systems which use similarity of appearance, not meaning, to suggest to the user various correctly spelled words that the user might have intended to use instead of an incorrectly spelled word. Such technique involves applying different rules to pick up common spelling errors, e.g., transposition of characters, use of wrong single character, etc., but does not involve attempting to interpret the meaning.

The closest patents of which I am aware will now be discussed. U.S. Pat. No. 4,044,475—K. Fujisawa et al, TRAINING MACHINE FOR KEYBOARDS, describes a training apparatus in which a first word is displayed on a screen, and the user attempts to key in the same characters. As the user does so, a comparison is made of digital representations of the respective characters and the word on the screen is erased when correct characters are entered or the entire word is placed back on the screen when an error occurs. There is no notion of commands, except very loosely if the displayed word just happens to be a command, and certainly no notion of similarity or closeness especially of semantics.

U.S. Pat. No. 4,500,964—A. F. Nickle, DIALOG USER ERROR DIAGNOSIS, SEVERITY, AND HELP TECHNIQUE, describes a system for checking data entries for errors, and providing an error message if an error occurs. The patent does not describe how the error analysis is made and does not suggest nor teach anything about correcting erroneous commands by using a new command that is semantically similar to an erroneous command.

U.S. Pat. No. 4,587,520—B. Astle, CURSOR CONTROLLED PAGE SELECTION IN A VIDEO DISPLAY, describes a system in which a display presents various commands on a screen and the patent is concerned with how close a cursor physically is to the location of each command. The present invention is concerned with how close two commands are semantically, rather than how close a cursor is in proximity to a displayed command.

U.S. Pat. No. 4,648,062—S. E. Johnson et al., METHOD FOR PROVIDING AN ON LINE HELP FACILITY FOR INTERACTIVE INFORMATION HANDLING SYSTEMS, describes a system in which a user is presented with all commands which could be validly issued from the state or context in which a user enters a request for help or an erroneous command. Such system differs from the invention because it issues all valid commands and does not select commands based on semantic similarity. Further, the suggested commands described in such patent are not generated on the fly but are predetermined.

U.S. Pat. No. 4,680,729—J. E. Steinhart, METHOD AND APPARATUS FOR STORING AND UPDATING USER ENTERED COMMAND STRINGS FOR USE WITH OTHERWISE UNASSIGNED KEYS, involves associating commands with user definable softkeys. The system allocates a new key to a command if it finds there is currently no key assigned to the command. Such action is done by comparing the entered command literally with all stored commands to find an exact match. Close matches are not considered and there is no attempt to use semantics as a basis of assigning keys.

U.S. Pat. No. 4,701,130—D. R. Whitney et al., SOFTWARE TRAINING SYSTEM, describes a system for training users to program. A tape has stored thereon a voice channel describing a series of oral instructions along with corresponding target programs. After listening to a voice instruction, the user keys in a program and it is compared to a target program. If the entered program is correct, i.e., the same as the target program, the user is then presented with the next segment of oral instruction. If the entered program is incorrect or not entered within a predetermined period, the correct or target program is displayed. The patent does not discuss closeness nor semantic similarity.

SUMMARY OF THE INVENTION

In view of the above, one of the objects of the invention is to provide an intelligent help system that, in response to the user entering an invalid command, will suggest to the user another command that is within a predetermined degree of similarity to the invalid command.

Another object of the invention is to provide an on-line intelligent help system that, when the user enters a goal or question, will provide suggestions to use commands based on the semantic similarity between the command's intent or purpose and the user's goal or question.

A further object is to provide a method for measuring the degree of similarity between two "close" commands and using such measurement as a basis of suggesting that one command be used instead of the other.

Briefly, in accordance with the invention, a plurality of intents are stored in the system which define the purposes of the various commands executable by the system. When the user enters an erroneous command, the system looks up the intent which defines such command and semantically compares such intent with other intents. When another intent is found, based on such comparison, to be within a predetermined degree of similarity, the command defined by such other intent is created as a suggestion for the user.

DRAWINGS

Other objects and advantages of the invention will be apparent from the following description taken in connection with the accompanying drawings wherein.

DETAILED DESCRIPTION

Figure 1:
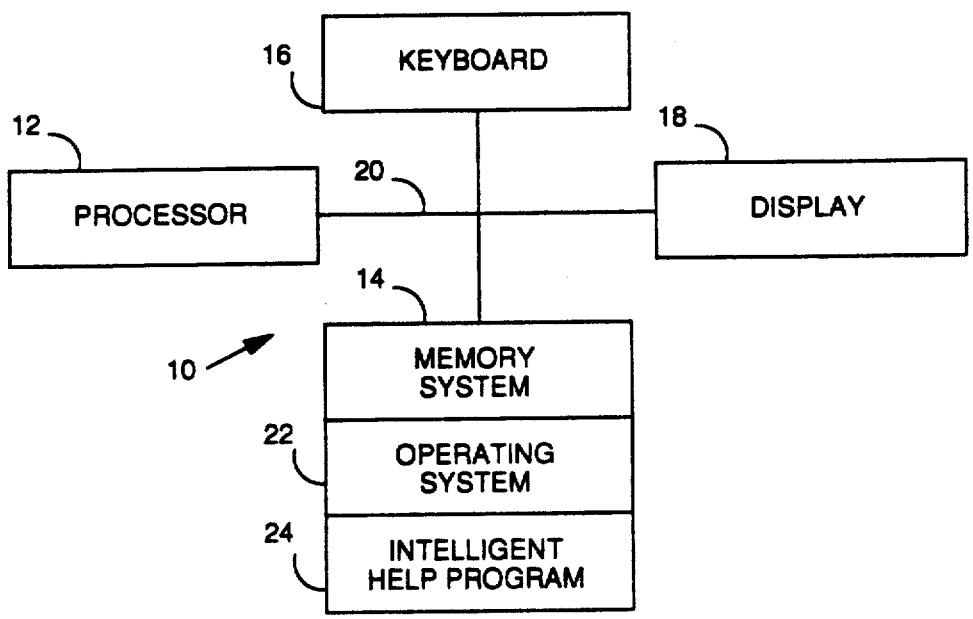
FIG. 1 is a block diagram of a data processing system embodying the invention.

Referring now to the drawings and first to FIG. 1, the invention is embodied in a data processing system including a personal computer 10 that comprises a processor 12, a memory system 14, a keyboard 16, and a display 18, all of which are interconnected by a bus system 20. Stored in memory system 14 are an operating system 22 and an intelligent help program 24. Except for program 24, all of the other elements are well known, conventional items. The personal computer 10 is preferably an IBM Personal System/2 computer provided with an OS/2 operating system 22. IBM, Personal System/2, and OS/2 are trademarks of International Business Machines Corporation. Computer 10 operates in a conventional fashion. Processor 12 executes programs that are stored in the memory system which system includes conventional devices (not shown) such as read only memory, random access memory, cache, hard disc and floppy disc as appropriate to the particular model computer being used. Keyboard 16 is used to input information from the user into the system, and display 18 outputs information from the system to the user. The combined function of the display and the keyboard is to provide an interaction between the user and the computer. The system is a command oriented system and program 24 functions to provide an on-line, interactive, intelligent help system, in the manner described in more detail hereinafter.

Figure 2:
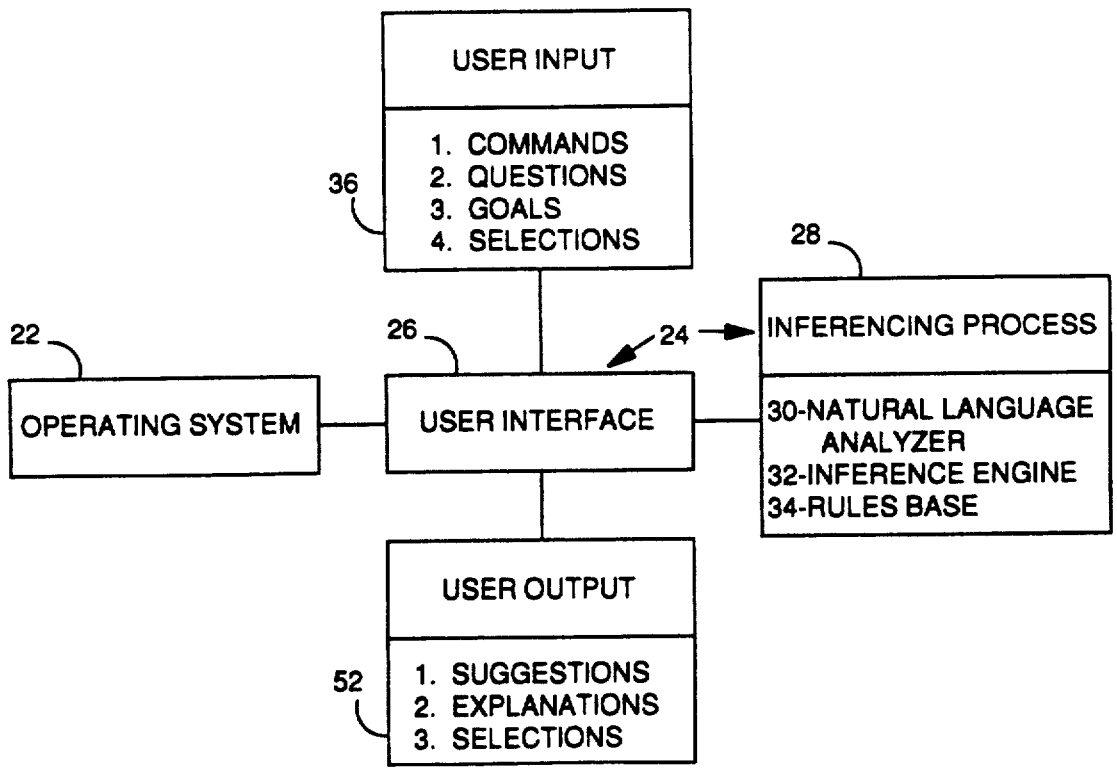
FIG. 2 is a schematic diagram generally illustrating the interaction between a user and the intelligent help system of the invention.

Referring to FIG. 2, intelligent help program 24 is divided into two major components, a user interface 26 and an inferencing process 28, to separate user interaction from problem solving. Such components are preferably setup as two separate tasks in an OS/2 environment. User input 36 is done through keyboard 16 and includes entering four different types of actions: system commands, questions, goals, and selections. Interface 26 receives such inputs and acts in the following general manner. A system command is first passed to operating system 22 and if it is a valid command, the action is executed and no action need be taken by the help system. If the command is wrong or in error, the operating system signals interface 26 and the erroneous command is passed on to the inferencing process 28 for analysis thereby. Concurrently, interface 26 informs the user of the error through a window on display 18 and affords the user the opportunity to view the results of the help system. In some instances, the user upon being informed of an error, will immediately recognize what was wrong with the command and proceed without needing any information from the help system.

Commands may be erroneous for a number of reasons, and sometimes more than one form of error may be present in a single user input. Common types of errors that may be present in association with an operating system are:

1. Errors in execution: These errors occur when the user knows the correct command to issue but does not carry it out correctly (e.g., a typographical error).
2. Errors in remembering: These errors occur when the user has forgotten all or part of the syntax of a command.
3. Errors in understanding: These errors occur when the user does not fully understand the meaning of a command, and so uses it in an invalid way.
4. Errors in preparation: These errors occur when commands are issued which look good superficially, but are invalid in the current environment (e.g., negative transference of commands across operating systems). The last situation includes errors that occur when the user has failed to make the necessary preparations so that a command will execute successfully.

The first two types of errors do not really require an artificial intelligence treatment since they could be handled by a spell checker and by an input-completing parser. However, such components are generally not widely available as parts of operating systems. Thus, it is necessary to offer assistance for such errors, along with more sophisticated help in providing for error types (3) and (4).

Process 28 include a natural language analyzer 30, an inference engine 32, and a rules base 34. Analyzer 30 is used to handle and parse questions inputted into the system using a natural language. Inference engine 32 and rules base 34 analyze the output of analyzer 30 and the other user inputs, to produce a user output 52 that is first stored in the system. When the user selects to receive help through viewing the output of the help system, the user output 52 is then retrieved and outputted to the user via display 18. The output includes suggestions, explanations of how and why, and selections which the system prompts the user to make. Specific examples of such items are described below.

Analyzer 30 includes a natural language parser along with a back end that transforms the parser output into goal representations 42. Rules base 34 constitutes the knowledge base of the expert system and is constructed by a knowledge engineer familiar with the data processing system and the operating system whose commands are being inputted. Base 34 includes representations of the different states of the system, of the commands and actions a user can take, and of the goals and state changes of the various commands and actions. The rules base also includes some frameworks for solutions to anticipated goals. The information is in the form of frames of four different types, a command frame, an action frame, a consequence frame, and a goal frame. A command frame has six different fields or slots:

1. A list containing the command name, its class, and two different representations of an argument list.
2. The name of the parse routine used to parse the arguments.
3. The "intents" of the command, namely, a short phrase defining the possible user goals which the particular command accomplishes. Intents are constructed in accordance with a standard syntactical structure, such as verb-noun, verb-adjective-noun, or verb-direct object-indirect object, as appropriate.
4. The preconditions of the command, i.e., those conditions that must be true before the command can be executed. This slot contains a list of disjunctions of conditions.
5. The post conditions of the command, namely, the conditions that become newly true after the command is executed. This slot is a list of conditions.
6. A property list for miscellaneous information such as whether the command handles wild cards, or is part of the operating system kernel.

Action frames are very similar to command frames except they have no associated parse routines or property lists. Action frames define the non-command actions which the user can do, such as inserting or removing diskettes, pressing certain key combinations, etc. Consequence frames are if-then rules used to interrelate goals and states, and their primary use is in cases where the user wants to effect a subset or side-effect of a more major operation. Such frames set forth the goal or state and the consequence. Goal frames define how certain goals may be divided into subgoals. Such frames lists the goal itself, what to do if any of the parameters are unbound, conditions or other relations to test, and subgoals which if achieved will guarantee that the goal will be satisfied.

Figure 3:
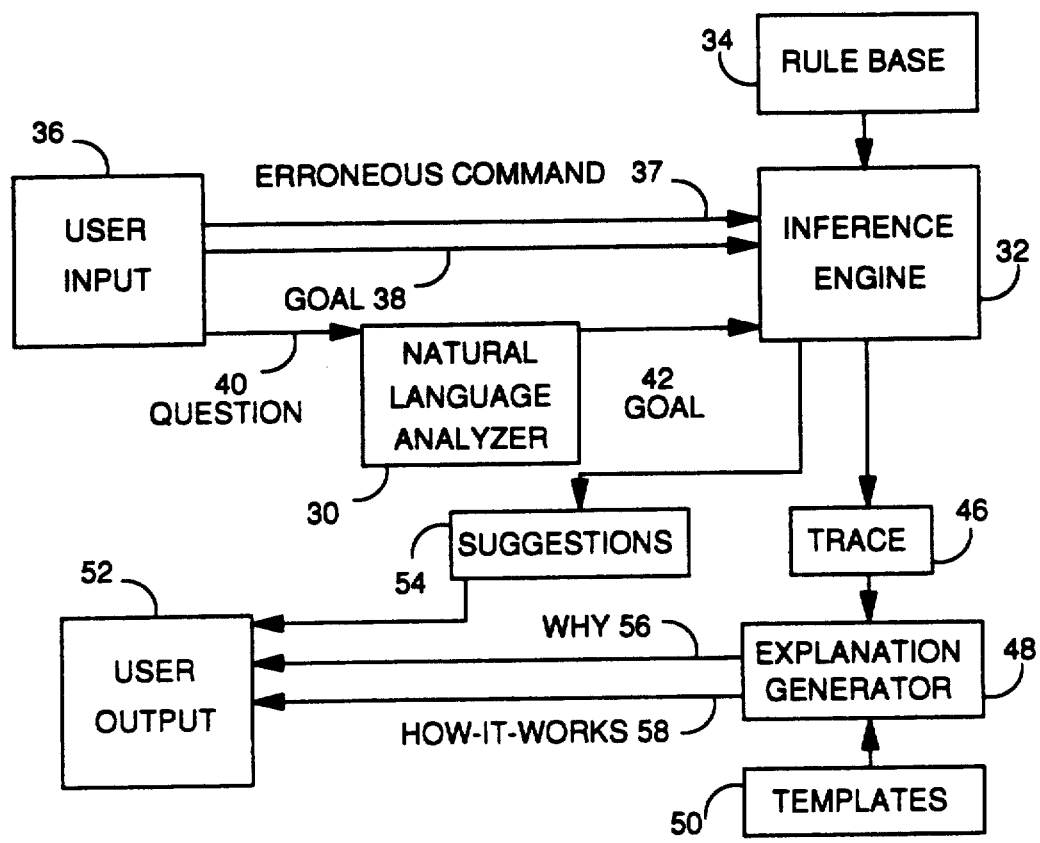
FIG. 3 is a schematic diagram useful in understanding the explanation process.

Referring to FIG. 3, user inputs 36 are passed to inference engine 32 one-at-a-time. An erroneous command 37 or a goal 38 is directly inputted into engine 32 while a question 40 is inputted into analyzer 30 which produces a goal 42 that is fed into engine 32. The goals are of various types. A "stated" goal is when a user asks a question. An "inferred" goal is when the system volunteers advice in response to an erroneous command. An "express" goal is an actual goal inputted to test the system. Inference engine 32 and rules base 34 form an expert system for analyzing the inputs and solving the problem defined thereby in accordance with general, known principles of artificial intelligence. In such system, rules base 34 is the knowledge base, and inference engine 32 is the problem solver. Together, they coact to solve the problem for a given domain. Solving the problem means either taking an incorrect command and converting it to a sequence of commands and/or actions which do what the system guesses the incorrect command is attempting to do, or taking a goal and generating a sequence of commands and/or actions which will achieve the goal. The sequence of commands and/or actions becomes what is presented to the user as a suggestion. The expert system tests the input as to it being a correct command, a command that is correct so far but is incomplete, a natural language question or command, an incorrect command, a goal expression, or a natural language question or command with spelling errors.

Inferencing process 28 acts in accordance with a set of generic rules to take a command or a goal and produce a set of subgoals. Secondary outputs of the application of a rule are commands to be recommended to the user, explanation fragments, and a set of rules to be tried further. The process bottoms out when a rule generates no subgoals. The generic rules do the following:, correct the spelling of a command, correct the spelling of arguments, correct the path, complete a command, change a command to one with similar meaning, select a command to satisfy the given command's preconditions, select a command whose intent matches the given goal, transform the given goal into a more general one, and break the goal into subgoals.

The output of engine 32 resulting from the analysis produces a trace 46 that is inputted into an explanation generator 48. The trace includes one statement for each applicable rule which statement is identified by a name and has parameters containing information on the specific user goals. The trace statements are arranged in a tree structure. Generator 48 uses trace 46 to search through templates 50 and dynamically produce or create complementary explanations 56 of why suggestions 54 were made and explanations 58 of how such suggestions work. The combination of the suggestions 54 and explanations 56 and 58 form a user output 52 that is stored in the memory system for subsequent selective output to the user in response to the user's request or selection. Templates 50 include names for all of the rule names that might appear in a trace. Each template, in addition to such name, contains one or more explanation fragments, and generator 48 combines such explanation fragments with the parameters from the trace statements and with connecting words to produce explanations in natural language, i.e., in a sentence structure that is grammatically correct in a language the user is conversant with.

Figure 5:
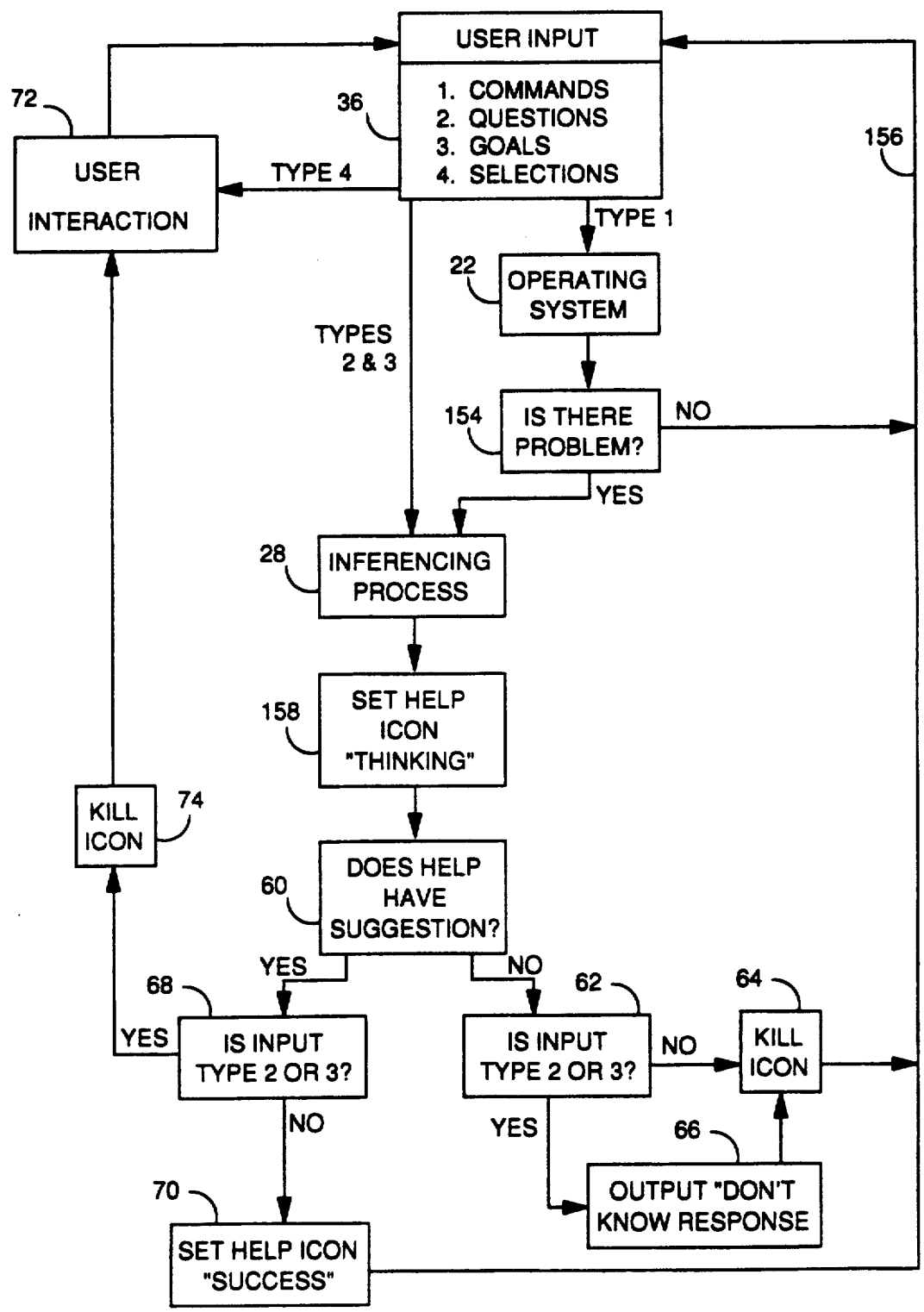
FIG. 5 is a schematic diagram useful in understanding user interaction with the system.

Referring now to FIG. 5, at the core of interaction between the user and the system is the user's input through keyboard 16, which input is, at any given time, one of four different types. Commands (type 1) are fed to the operating system 22 which determines in step 154 whether or not there is a problem with the commands, i.e., is the command incorrect or erroneous. If there is no problem, the command is successfully executed and control is transferred by flow line 156 back to the status of awaiting a new or subsequent user input. If there is a problem determined by step 154, then inferencing process 28 is started and a three state Help icon (not shown) is set to a "thinking" state by step 158 to indicate to the user that the inferencing process has begun. The icon is also settable to an "off" state, and to a "success" state which indicates to the user that the help system has a positive response.

Once process 28 has developed a response in the form of a suggestion or when the processes have completed their analysis with no suggestion or response being developed, step 60 makes such determination and branches to either step 62 or step 68 dependent on the presence or absence of a response or suggestion. If there is none, step 62 determines if the initial input was a type 2 or 3. If it was not, then step 64 simply turns the Help icon to an off state and returns control by line 156 to the user input. If the determination from step 62 was positive, which would be the case when the user input was a question or a goal and the user was expecting a response, then step 66 outputs to the user a response to the effect that the system does not know the answer. Control then passes to step 64 to kill or turn the Help icon off and then returns to the user input.

If step 60 determines there is a suggestion or response, then step 68 decides if the user input was type 2 or 3. If not, step 70 then sets the Help icon to the "success" state indicating to the user that the help assistance has a suggestion or response for the user. Control then passes to the user input. At such a point, the user has the option to view the response and look at the provided help, or the user may bypass the help and otherwise proceed such as by entering a valid command or a question. If the user wants to view the suggestion, the user then makes a selection input (type 4) and control then passes to the help interaction step 72, which allows the viewer to see the suggestion, and any explanations relative to it. If more than one suggestion or course of action is provided, the user continues with the interaction. If as a result of step 68 a positive determination was made, a branch is made to step 74 which then kills or turns the Help icon off and then step 72 is entered. Such steps are done based on the assumption that a user asking a question or inputting a goal, wants a positive response and therefore will interact with the help system to view the expected answer. It is therefore not necessary to return to the user input step 36.

As previously indicated, the knowledge or rules base is created with knowledge of the commands and actions available to the user, takes into account certain relationships between goals and states, and provides readymade frameworks for solutions to anticipated goals. Such knowledge base would vary from system to system. The interaction of the rules base by the inferencing processes is done in accordance with known principles of artificial intelligence. When an erroneous command 37 is encountered by inference engine 32, as a result of step 54, the help system performs the functions or process shown in FIG. 4. Input 80 is the incorrect command X and step 82 looks up or ascribes to such command an intent. Step 84 proceeds to step through the various commands to allow a comparison to be made between the inferred intent and the intent associated with a command. In step 84, a particular command being accessed is designated command Y and such steps look up the intent of command Y. Step 86 then compares and decides if the two intents are semantically similar. If they are not similar, a branch is made back to step 84 to access the next command or complete the process in step 88 when the are no further commands to analyze. If the intents are similar as determined in step 86, then step 90 determines if command Y can be executed in the context of the user's current status, and if it can be, then a suggestion is created for the user to use command Y.

Figure 4:
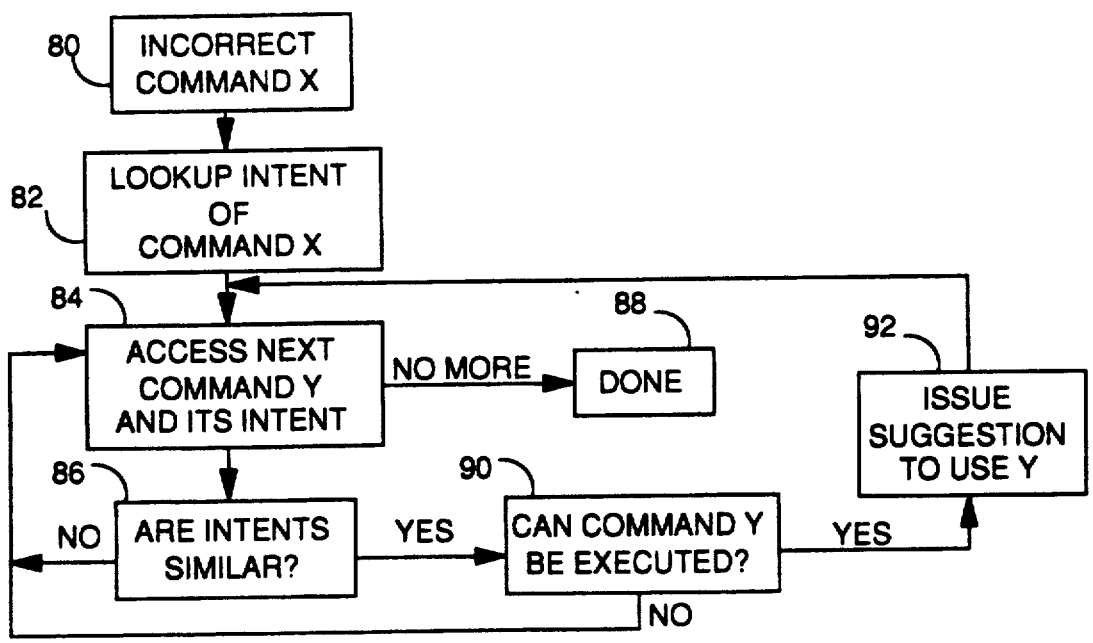
FIG. 4 is a flow diagram illustrating the general steps of making a recommended suggestion in accordance with the invention.
Figure 6:
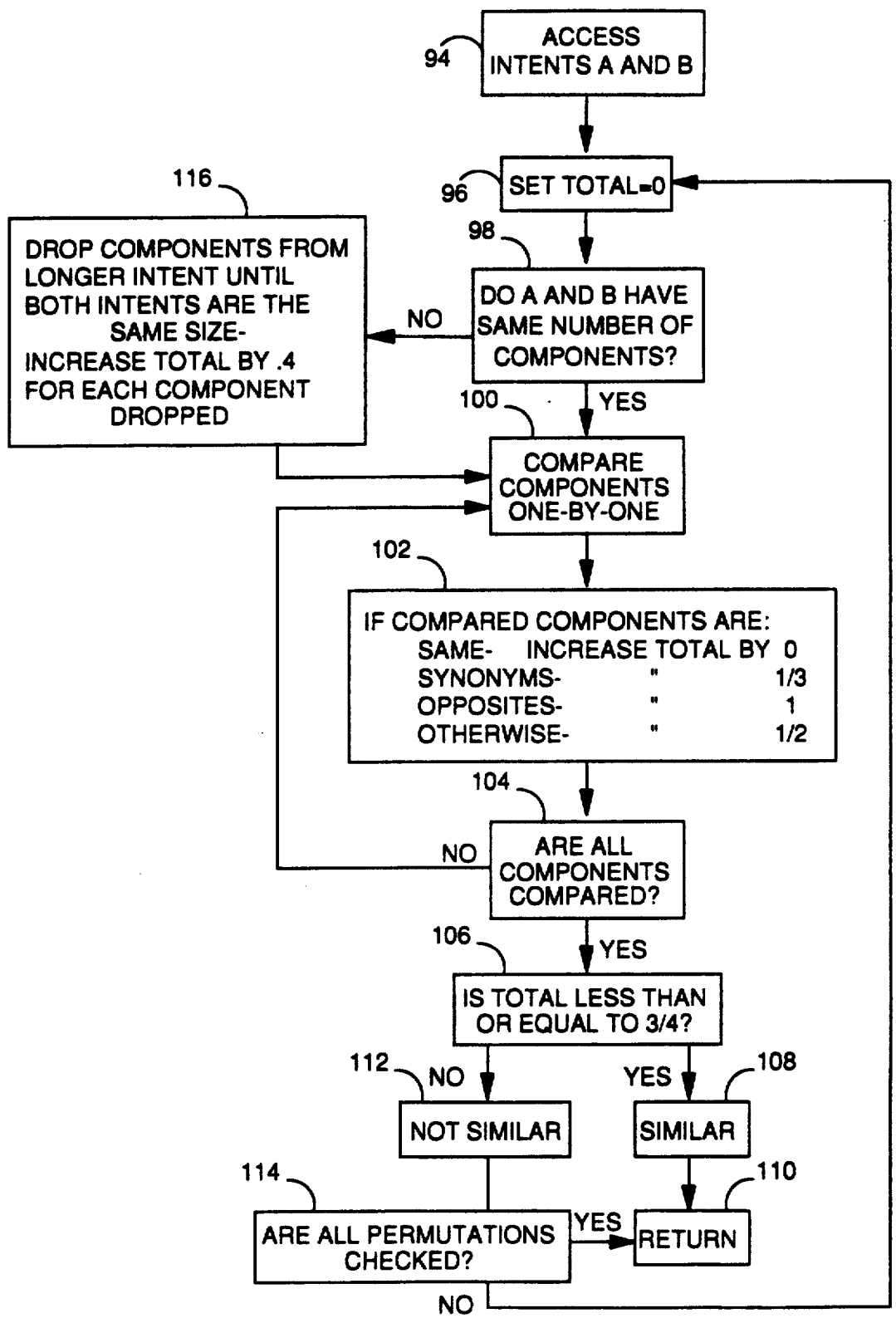
FIG. 6 is a detailed flow chart of one of the general steps shown in FIG. 4.

Step 86 is only generally shown in FIG. 4 and is shown in detail in FIG. 6, the details of which will now be described. Step 94 accesses the two intents A and B to be compared. A variable named TOTAL is set to zero and it will be used to accumulate predetermined values ascribed to different degrees of similarity, described hereinafter. Step 98 looks at the components of both intents to see if they have the same number of components. If they do, step 100 proceeds to compare the respective words or components one-by-one and ascribe a value (step 102) to each component according to the degree of semantic similarity. If the components have the same meaning, the ascribed value is 0 and the TOTAL is not increased. If the components are synonyms, the value is $\frac{1}{4}$. If the components have opposite meanings, the value is 1. If the meaning is other than being the same, synonymous or opposite, the value is $\frac{1}{2}$.

Step 104 determines if all of the components have been compared and loops or branches back to step 100, until a full comparison of all components has been made. The sameness of two components can be determined by comparing corresponding characters. Synonyms and opposites or antonyms can be determined using the principles of commercially available software dictionaries of such words.

Once all the comparisons have been made, step 106 then decides whether the sum of the ascribed values in TOTAL exceeds a predetermined threshold value of ¾. If the value of TOTAL is less than or equal to ¾, the conclusion is made that the two intents A and B are similar and an indication of such conclusion is stored in step 108 prior to making a return 110. If step 106 results in a negative determination, an indication thereof is stored in step 112. Step 114 then checks to see if all permutations of different length intents A and B have been checked and if they have, a return is made in step 110. If all permutations have not been checked, a branch is made back to step 96 to redo the process or loop described above.

It should be noted that such threshold value is arbitrarily chosen relative to the various conditions for which values are assigned in step 102 based on semantic similarity and in step 116 based on inequality in the lengths of the intents. The effect of such threshold value is to conclude two intents are not similar:

1. If the two intents differ in length by more than one component; or
2. If any component has a meaning opposite to the meaning of the component being compared with.

Conversely, two intents are considered similar when:
1. Intents A and B are the same length, and
   a. There are no more than two components in one intent synonymous with respective components of the other intent while all other components are the same, or
   b. There is no more than one component that is a synonym plus one component that is otherwise, while all other components are the same; or
   c. All components are the same; or
2. Intents A and B differ in length by one component and
   a. There is no otherwise component; or
   b. There is no more than one synonym.

It should be obvious that other values and conclusions can be assigned which have the effect of determining the degree of similarity. For example, length can be eliminated as a factor and the similarity based only on semantic similarity between the various respective components. It should be further obvious that the various "intents" will vary dependent upon which command oriented system the help system is designed for. Thus, in order to more fully understand the invention, the following examples are provided as guidance to knowledge engineers who would create the various intents associated with any specific command oriented system.

Example 1. Assume the system has a personal computer disk operating system (PC DOS) that uses the commands RD and RMDIR to erase directories, and DELETE and DEL to erase files. Suppose a user wants to erase an existing directory called MYDIR but issues the command DELETE MYDIR. In accordance with the intelligent help system of the invention, the system recognizes DELETE MYDIR to be an erroneous command and suggests that the user enters the command RD MYDIR. The manner in which this is done is as follows. A first intent {ERASE DIRECTORY} is stored in the system for the commands RD and RMDIR. A second intent {ERASE FILE} is stored in the system for the commands DEL and DELETE. The system, upon locating both intents, would then proceed through the analysis illustrated in FIG. 6. The first component "erase" of each intent is the same while the second components "directory" and "file" are considered different, but not opposite, so that TOTAL has a value of ⅓. This is below the threshold value of ¾ so the intents are considered similar and the suggestion is made to issue the RD MYDIR as a suggestion.

Example 2. Suppose the user asks how he can display a directory, and that the question gets translated into the intent {DISPLAY DIRECTORY}. Suppose that the DIR command has the associated intent {LIST CURRENT DIRECTORY}. This command will be recommended to the user since the two intents will be judged to be similar, as follows. The two intents are of different lengths so, in turn, each component of the longer one {LIST CURRENT DIRECTORY} will be dropped and any previously dropped component restored. The resultant intent is compared with {DISPLAY DIRECTORY}. Therefore, at some point, CURRENT will be dropped incurring a TOTAL so far of 0.4, and {LIST DIRECTORY} will be compared with {DISPLAY DIRECTORY}. A dictionary in the system will record that "list" is a synonym of "display", incurring as addition to TOTAL of ⅓. Since DIRECTORY is common to both, the resultant value of TOTAL is 0.733. Such value is below the threshold of 0.75. Thus, the intents are considered similar and the suggestion is made to issue DIR.

Example 3. Suppose the user issues the command MD MYDIR to create or make a directory and directory MYDIR already exists so that the command cannot be executed. The intent {CREATE DIRECTORY} has been stored in the system for MD. When the system compares this intent with the intent {ERASE DIRECTORY} for the command RD, it will find the intents agree in all but one position. However, the score assigned to TOTAL will be 1, since a dictionary in the system records that "create" and "erase" are opposites. Since 1 is greater than 0.75, the system does not suggest, on the grounds of semantic similarity, RD MYDIR as a correct command for MD MYDIR. However, other rules in the system may cause RD MYDIR to be suggested on the basis that the user committed a typographical error.

It is apparent to those skilled in the art that many changes can be made in the details and arrangements of steps and parts without departing from the scope of the invention as defined in the appended claims.

What is claimed is:

1. The method of operating a data processing system having a memory system for storing programs and data, a processor for executing said programs, input means selectively actuated by user to input user actions comprising questions and commands, and output means to visually provide said user with suggestions, said method providing an intelligent help system for suggesting valid commands to the user when the user enters questions and erroneous commands, comprising the steps of:
   (a) storing within said memory system a plurality of predefined intents, each predefined intent including a plurality of words verbally defining the purpose of a different valid command;

(b) in response to the user entering a question or an erroneous command, storing within said data processing system an inferred intent which contains a plurality of words verbally defining a possible purpose of said question or said erroneous command;

(c) semantically comparing words in said inferred intent with words in different ones of said predefined intents to find a predefined intent that is semantically similar to said inferred intent, said comparing being done by (c1) selecting one of said predefined intents and pairing words in said inferred intent with words in said one predefined intent, (c2) determining whether the meanings of the words in each set of paired words are the same, synonymous, opposite, or not the same, synonymous, or opposite, and (c3) deciding, based on the results of step (c2), whether said inferred intent and said one predefined intent are semantically similar or dissimilar, step (c3) deciding that the intents being compared are semantically similar when each intent has the same number of words, and a. there are no more than two sets of paired words having synonymous meanings while each other set of paired words has the same meaning, or b. there is no more than one set of paired words that are synonymous plus one set that has a meaning of being not the same, or synonymous, or opposite, while each other set has the same meaning, or c. each set of paired words has the same meaning; and (d) creating a suggestion for said user to use the valid command, the purpose of which is defined by said one predefined intent when step (c3) decides said one predefined intent, is semantically similar to said inferred intent.

2. The method in accordance with claim 1 wherein:

step (c2) is performed to make the determination by accumulating numerical values assigned on the basis of meanings of each set; and step (c3) decides on the basis of whether the accumulated values for all sets is within or outside of a predetermined range of accumulated values.

3. The method in accordance with claim 2 wherein: said numerical values are 0 for same meaning, $\frac{1}{3}$ for synonymous meaning, 1 for opposite meaning, and $\frac{1}{3}$ for meaning other than same, synonymous, or opposite; and said predetermined range is 0 to $\frac{1}{3}$.

4. The method in accordance with claim 1 further comprising:

determining when the user enters a command whether such command is a valid command or an erroneous command and executing such command when it is determined to be a valid command performing steps (b)-(d) when it is determined to be an erroneous command.

5. In a data processing system having an intelligent help system for suggesting valid commands to a user when the user enters questions and erroneous commands into said data processing system, a memory system for storing programs and data, a processor for executing said programs, input means selectively actuated by said user for input of questions and commands, and output means for visually providing said user with suggestions, said help system comprising:

(a) means for storing within said memory system a plurality of predefined intents, each predefined intent including a plurality of words verbally defining the purpose of a different valid command;

(b) means operative, in response to the user entering a question or an erroneous command, for storing within said data processing system an inferred intent which contains a plurality of words verbally defining a possible purpose of said question or said erroneous command;

(c) means for semantically comparing words in said inferred intent with words in different ones of said predefined intents to find a predefined intent that is semantically similar to said inferred intent, said comparing being done by (c1) means for selecting one of said predefined intents and pairing words in said inferred intent with words in said one predefined intent, said one predefined intent and said inferred intent having different numbers of words, said means (c1) being operative to first drop one or more words from the longer intent and then pair the remaining words, (c2) means for determining whether the meanings of the words in each set of paired words are the same, synonymous, opposite, or not the same, synonymous, or opposite, and (c3) means for deciding, based on the results of means (c2), whether said inferred intent and said one predefined intent are semantically similar or dissimilar, said means (c3) deciding the two intents being semantically compared are (a) semantically similar when no more than one word is dropped from the longer intent and
1. none of the compared sets of paired words has a meaning of being other than the same, synonymous, or opposite meanings, or
2. there is no more than one set of paired words having a synonymous meaning; or (b) semantically dissimilar when more than one word is dropped or when neither of the conditions of (a)1 or (a)2 are met; and (d) means for creating a suggestion for said user to use the valid command, the purpose of which is defined by said one predefined intent when means (c3) decides said one predefined intent, is semantically similar to said inferred intent.

6. A data processing system in accordance with claim 5 wherein:

said means (c2) makes the determination by accumulating numerical values assigned on the basis of meanings of each set; and said means (c3) decides on the basis of whether the accumulated values for all sets is within or outside of a predetermined range of accumulated values.

7. A data processing system in accordance with claim 6 wherein:

said numerical values are 0 for same meaning, $\frac{1}{3}$ for synonymous meaning, 1 for opposite meaning, and $\frac{1}{3}$ for meaning other than same, synonymous, or opposite; and said predetermined range is 0 to $\frac{1}{3}$.

8. A data processing system in accordance with claim 5 further comprising:

(e) means for determining, when the user enters a command, whether such command is a valid command or an erroneous command, and executing such command when it is determined to be a valid command and operating means (b)–(d) when it is determined to be an erroneous command.

9. A data processing system in accordance with claim 5 wherein:
means (c) is repetitively operated for comparing different variations formed by dropping different words until either a variation is found that is semantically similar, or until all variations are decided to be semantically dissimilar.

* * * * *